United States Patent [19]
Grim

[11] 4,063,380
[45] Dec. 20, 1977

[54] NO STRESS DIP NET

[76] Inventor: John S. Grim, Kerr Road, Rhinebeck, N.Y. 12572

[21] Appl. No.: 530,055

[22] Filed: Dec. 6, 1974

Related U.S. Application Data

[63] Continuation-in-part of Ser. No. 425,187, Dec. 17, 1973, abandoned.

[51] Int. Cl.² .............................................. A01K 77/00
[52] U.S. Cl. ...................................................... 43/11
[58] Field of Search ...................... 43/11, 12, 4, 55, 56, 43/14

[56] References Cited
U.S. PATENT DOCUMENTS

| 2,253,688 | 8/1941 | Collins | 43/55 |
| 2,600,826 | 6/1952 | Allen | 43/56 |
| 2,847,790 | 8/1958 | Tjernagel | 43/11 |
| 3,747,250 | 7/1973 | Willinger | 43/11 |

Primary Examiner—Warner H. Camp

[57] ABSTRACT

A fish dip net assembly is constructed of water permeable and non-permeable material and is designed to catch or permit manipulation of fish between containers or bodies of water while providing and maintaining a continuous water environment to prevent injury or trauma to the fish. The permeable portion of the dip net assembly is fabricated from woven mesh material, which permits the net to be used for capturing fish, while the non-permeable portion of the dip net assembly is fabricated from a water retaining material to provide and maintain a continuous water environment for the fish. Various embodiments of the invention for providing specialized functions relating to fish handling are described.

3 Claims, 17 Drawing Figures

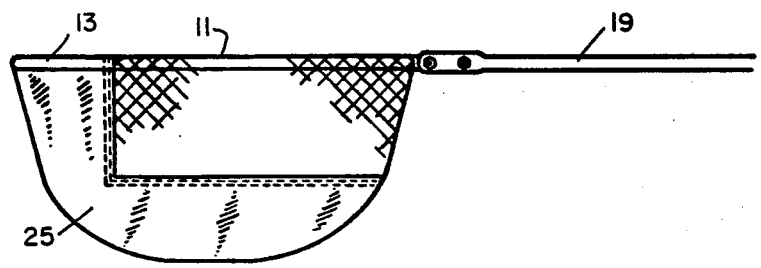
Fig.—2
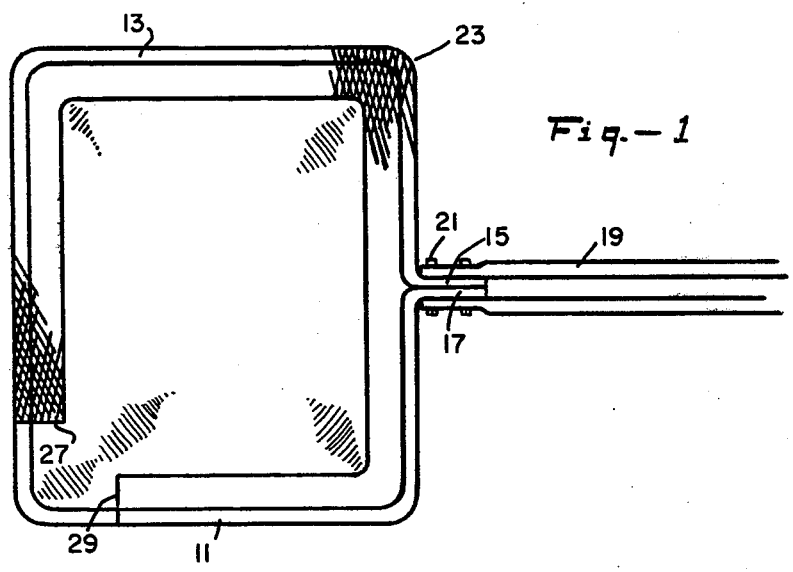
Fig.—1
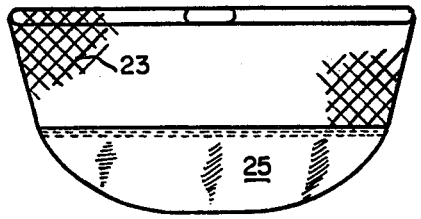
Fig.—3
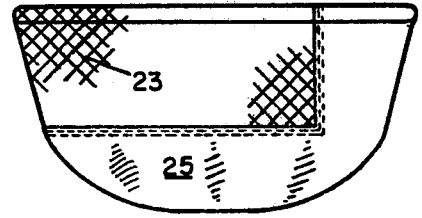
Fig.—4

NO STRESS DIP NET

CROSS-REFERENCE TO RELATED APPLICATIONS

This application is a continuation-in-part of Application Ser. No. 425,187, No Stress Dip Net, filed by John S. Grim, Dec. 17, 1973 and now abandoned.

BACKGROUND OF THE INVENTION

In removing fish from a body or container of water, as for example, in moving fish from a tank or container to another tank or aquarium or vice-versa, the scales or fins of the fish can become entangled in the netting, producing injury to the fish when removing them from the net. Another problem in moving fish from a water environment is that the fish, when removed from their natural environment, may suffer temporary or permanent injury resulting from trauma, shock or stress. Such injuries or death may result from sudden changes in environmental conditions such as maintaining the fish out of water. Thus the conventional methods for handling fish are hazardous to the fish, these hazards varying in frequency and scope in accordance with the specific environmental changes suffered by the fish.

SUMMARY OF THE INVENTION

In accordance with the present invention, there is provided an improved fish dip net assembly which is adapted to catch fish in a confined area such as a tank or aquarium, and transfer the fish to another container without removing the fish from their natural environment, thereby preventing injury, stress and trauma to the fish. This is accomplished by combining permeable or water-pervious and non-permeable or water impervious material in a single dip net assembly, the non-permeable material functioning to maintain water in the net during withdrawal of the net from the water, the water pervious material assisting in catching the fish and limiting the amount of water in the assembly. Various embodiments of the invention are shown and described in accordance with varied functions being provided for the fish.

Accordingly, a primary object of the present invention is to provide an improved fish dip net assembly.

Another object of the present invention is to provide an improved dip net assembly having permeable and non-permeable portions, the non-permeable portion being adapted to contain the fish in a constant water environment irrespective of the location of the net.

Still another object of the present invention is to provide an improved fish dip net assembly having permeable and non-permeable portions, the respective portions being arranged to permit transfer of fish while contained in a water environment without entangling the fish in the non-permeable portions.

BRIEF DESCRIPTION OF THE DRAWINGS

FIG. 1 is a top view of a fish dip net assembly.

FIG. 2 illustrates a side view of the fish net assembly shown in FIG. 1 illustrating details of the permeable and non-permeable portions.

FIG. 3 is an end view of another embodiment of the invention having a different configuration of the permeable and non-permeable portions.

FIG. 4 is an end view of another embodiment of the invention having a different arrangement of the permeable and non-permeable portions.

DETAILED DESCRIPTION OF A PREFERRED EMBODIMENT

Figure 5A:
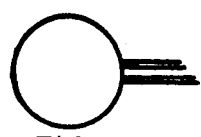
FIGS. 5A through 5D are top views of various configurations of a fish dip net assembly.
Figure 5C:
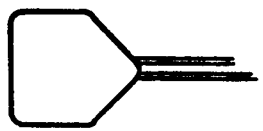
Figure 5B:
Figure 5D:
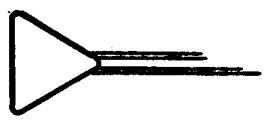

Referring now to the drawings and more particularly to FIG. 1 thereof, there is illustrated a top view of a preferred embodiment of the instant invention adapted to catch, lift, move or otherwise manipulate live fish in their natural water environment. The net generally denoted as 11 includes a metallic frame 13 which is shaped in the form of a hoop or ring of rectangular configuration as shown in FIG. 2, the frame being preferably constituted of water resistant metalic material which may be encapsulated in a plastic or rubberized sleeve for protective purposes. The end portions 15, 17 of the frame are joined to a handle member 19 by fasteners 21 which could comprise screws, rivets or other conventional fastening means. The net assembly is composed of a permeable portion 23 and a non-permeable portion 25. The permeable portion 23 in the preferred embodiment does not extend around the entire periphery of the dip net assembly, since the area between points 27, 29 is also composed of non-permeable or water impervious material to pour the fish from the pocket of water more fully described hereinafter. The permeable portion 23 is generally constituted of a natural or synthetic material woven in mesh form, the opening or mesh size corresponding to the size of the fish being handled. The non-permeable portion 25 is generally constituted of a water impervious material such as sailcloth, rip-stop nylon or canvas or any suitable water retaining material which can be connected or attached to the associated permeable portion. Because of the water impervious nature of the non-permeable portion 25, the latter deforms readily from a water-free to a water containing configuration. The water pervious nature of the permeable portion acts to release all excess water beyond that needed for properly confining the fish and thus the weight of the dip net assembly together with the withdrawn fish and water is not excessive and will not distort the handle or frame of the apparatus. While the preferred embodiment of the invention shown in FIG. 1 is rectangular to facilitate catching fish in a rectangular container or aquarium, it is obvious that this is merely a design feature and the invention contemplates various configurations as more fully described hereinafter. Likewise, while separate handle and frame members are utilized in the preferred embodiment, a one-piece handle and frame member could be employed.

Referring now to FIG. 2, details of the configuration and relationship between the permeable and non-permeable portions of the preferred embodiment are illustrated. The band of permeable material 23 extends around the frame 13 to which it is attached, while the non-permeable material 25 attaches to one of the front corners of the frame and extends from the corner to the lower edge of the band of netting material 23 to which it is secured, thus forming a pocket or depression to entrap and retain the water environment for the fish when lifted. The pocket is so designed that it does not contribute resistance as it is propelled through the water, but will retain water and the fish when the net is lifted from the water. By tilting the net, the fish can be literally poured from the net into the water receptacle to which they are transported or alternatively the net can be lowered into the new environment allowing the fish to swim away. The frame or ring 13, as noted, would be formed of a water resistant metal or a suitable plastic, and may be rectangular, circular, triangular, or any desired configuration. It will be appreciated that the non-permeable material 25 is pocketed from a slight to a severe degree to retain water and fish when the net is lifted from the water.

FIGS. 3 and 4 illustrate front and rear views respectively of the dip net configuration relative to Frame 13 as shown in FIGS. 1 and 2 to clarify details of the construction thereof. As shown in FIG. 3, the permeable material 23, when attached to the non-permeable portion forms the pocket, and the pour corner is not visible. However, it will be appreciated that for special uses, such as sorting fish, the net could be built with a band of mesh material being attached to the entire frame 13 and the non-permeable material being attached to the lower edge of the netting, and still be within the scope of the instant invention.

The rear view of the invention relative to frame 13 shown in FIG. 4 illustrates the pour corner on the right side of the drawing. However, the non-permeable or water impervious portion could comprise any section of the net depending on the function to be performed. It is apparent from FIGS. 3 and 4 how water is retained in the pocket of the net, and how the water will be set at that level when the net is removed from the water.

To remove the fish from an aquarium or tank, the net 11 would be swept from behind the fish toward the opposite wall. The fish tend to keep ahead of the net until they can go no further, at which point they are entrapped within the net. The design of the net allows the impermeable portion 25 to collapse so it does not push against the water as the net is moved through the water. The more horizontal the net is held, the longer the pocket can be without producing resistance to the back flow of water. The design also causes excess water to drain out through the permeable netting while the fish are retained in the water in the non-permeable part of the net.

Referring now to FIG. 5, there is illustrated a variety of general dip net configurations in which the invention may be used. A round net is illustrated in FIG. 5A, while FIG. 5B illustrates a rectangular configuration. A triangular configuration is illustrated in FIG. 5D, while a combination rectangular-triangular configuration is shown in FIG. 5C. The specific configuration of the net is not a significant criteria, since the same construction techniques are employed. Likewise, as shown and described in FIG. 6, the specific arrangement of the permeable and non-permeable portions may be varied considerably without departing from the scope of the instant invention.

Figure 6A:
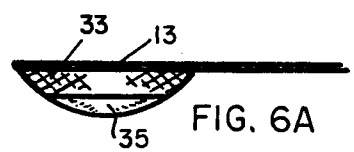
FIGS. 6A through 6G illustrate various configurations of fish net assemblies.

Referring now to FIGS. 6A-6G, there is illustrated dip net assemblies employing various configurations of permeable and non-permeable material. FIG. 6A illustrates a side view of a dip net assembly in which a band of netting material 33 extends around the entire frame 13, and is attached at its lower portion to a pocket 35 of permeable material. The net could utilize any of the configurations shown in FIG. 5 or any variation thereof.

Figure 6B:
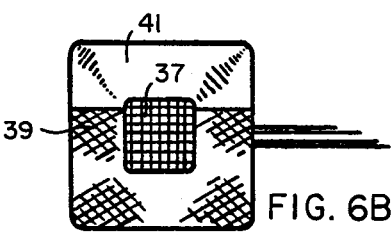
Figure 6C:
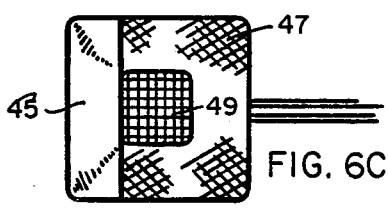

FIG. 6B is a top view of another dip net configuration in which the bottom portion 37 is made of non-permeable mesh, while the permeable portion 39 is attached to non-permeable portion 41 such that the net would require tipping to the upper side to entrap and contain the water therein. A variation of this arrangement is shown in FIG. 6C in which a pocket 45 of non-permeable material is positioned in the front of the net and attached to permeable netting section 47. As in FIG. 6B, the center area 49 is made of non-permeable material.

Figure 6F:
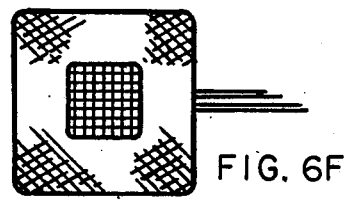
Figure 6D:
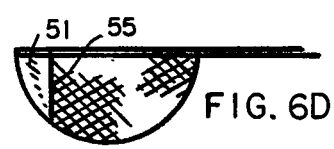
Figure 6E:
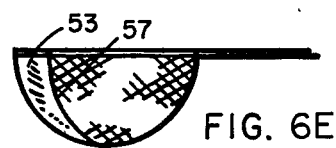
Figure 6G:
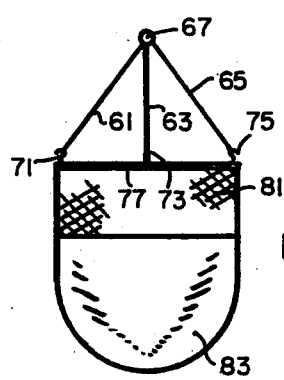

FIGS. 6D and 6E represent side views of a net assembly in which non-permeable pockets 51 and 53 respectively are positioned at the from of the dip net, the only difference being the rear contour 55, 57 of the nets. FIG. 6F illustrates a top view of a conventional dip net made entirely of water permeable mesh. In present commercial fishing operations, the crane controlled large baskets and unloading nets crush the fish in the bottom of the net, causing them to lose quality and value. Referring now to FIG. 6G, there is illustrated a side view of a net assembly that is built with a three point cable construction comprising cables 61, 63, 65, and incorporating the principles of the instant invention. The upper end of the cables attach to a ring 67, while the bottom of the cables attach to hooks 71, 73, 75 which in turn attach to frame 77 of the assembly. The permeable portion 81 and non-permeable portion 83 may be constructed of heavier material in accordance with the load to be maintained and/or transported. Such a net would be used to unload dead fish or transport dead fish in commercial quantities from a ship to market. The fish on the bottom portion 83 will not be crushed as long as they are suspended in the water in the net. Such a net would be less expensive than a fish pump, could be built inn varying sizes, and as previously indicated, could be used by conventional unloading winches and cranes.

Figure 7:
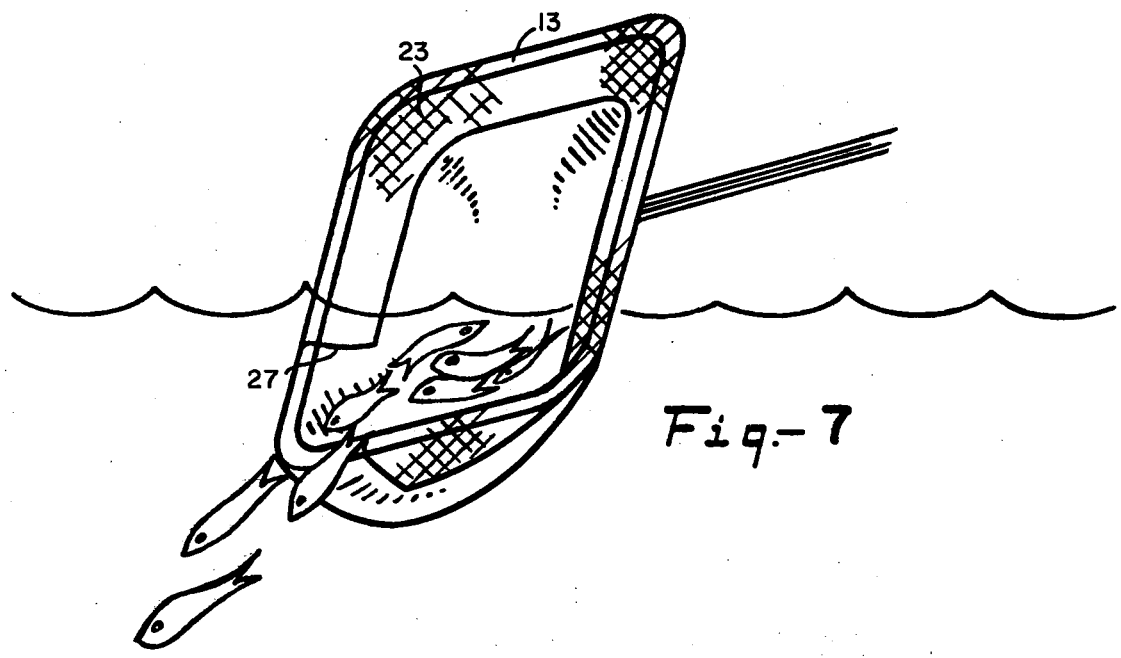
FIGS. 7 and 8 are plan views of the instant invention illustrating operational details of the instant invention.

FIG. 7 illustrates the manner in which fish may be released from a net. The configuration of the net assemblies shown in FIGS. 7 and 8 corresponds to the preferred embodiment heretofore described, and are so identified by corresponding subscripts in which the non-permeable portions forms a combined pocket and pour spout. In the arrangement shown in FIG. 7, fish are released into a large body of water such as a pond or stream. By placing the net assembly below the water level as shown, the fish can swim through the pocked into the water. Alternatively, a hand can be inserted below the non-permeable portion 25 to expel the fish from the assembly.

Figure 8:
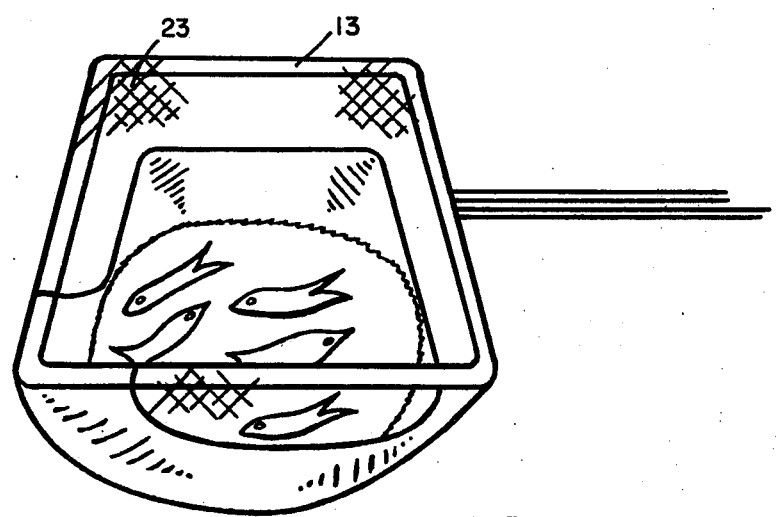

FIG. 8 illustrates the manner in which fish are contained in their normal environment within the present invention. As previously indicated, by maintaining the fish in their water emvironment, the traumatic experience associated with fish out of water leading to stress and shock with increased susceptability to disease and parasitism are completely elminated.

A final use for the subject invention is removing water from a container heavily populated with fish without removing the fish. This chore is accomplished by pushing the net into the water with one hand without allowing the mounting ring to be immersed whereby water flows through the permeable mesh into the non-permeable pocket, the mesh serving to keep out the undesired fish.

While the invention has been shown and described with reference to preferred embodiments thereof, it will be understood by those skilled in the art that other changes in form and detail may be made therein without departing from the spirit and scope of the invention.

What is claimed is:

1. A dip net comprising in combination
a handle member and a net assembly,
said net assembly including a frame connected to said handle member,
said net assembly being composed of separate sections of water permeable and water impermeable material interconnected to define a pocket configuration,
said pocket configuration being readily deformable in a water environment into a water retaining configuration including a lower porion adpated to provide and maintain a continuous water environment for fish within said pocket,
said configuration of said impermeable material extending upwardly from said pocket to said frame member and adapted to form a pour spout about one area of said frame, the remainder of said frame having sections of said water permeable portion associated therewith,
said water permeable section being adapted to facilitate capture of fish from a water environment and removal of excess water from said net assembly,
said configuration of said impermeable section being adapted to provide and maintain a continuous water environment for fish during capture and transfer of said fish from one water environment to another,
said frame being of generally rectangular configuration and said upwardly extending impermeable material encompassing one of the corners of said frame to form said pour spout.

2. An invention of the type claimed in claim 1 wherein said water impermeable material is sailcloth, rip-stop nylon or canvas.

3. Apparatus of the type claimed in claim 1 wherein said permeable material is comprised of woven mesh.